United States Patent [19]

Cohen

[11] Patent Number: 4,803,331
[45] Date of Patent: Feb. 7, 1989

[54] POWER CONTROL AND LINE VOLTAGE MONITOR/COMPENSATOR FOR RESISTANCE SPOT WELDING MACHINES

[76] Inventor: Robert K. Cohen, 244 Hansen Ave., Albany, N.Y. 12208

[21] Appl. No.: 7,940

[22] Filed: Jan. 28, 1987

[51] Int. Cl.$^4$ ............................................. B23K 11/24
[52] U.S. Cl. ................................................... 219/110
[58] Field of Search ....................... 219/108, 110, 114; 323/322, 323; 307/252 N, 252 T, 252 UA

[56] References Cited

U.S. PATENT DOCUMENTS

| | | | |
|---|---|---|---|
| 3,452,214 | 6/1969 | Martin | 323/322 |
| 3,691,452 | 9/1972 | Aquiar | 323/322 |
| 4,001,539 | 1/1977 | Franchi et al. | 219/110 |
| 4,289,948 | 9/1981 | Jurek et al. | 219/110 |
| 4,343,980 | 8/1982 | Stanya et al. | 219/110 |
| 4,387,289 | 6/1983 | Nakata et al. | 219/110 |
| 4,396,869 | 8/1983 | Rosenbaum et al. | 323/322 |
| 4,459,457 | 7/1984 | Jurek | 219/110 |
| 4,459,457 | 7/1984 | Jurek | 219/110 |
| 4,499,363 | 2/1985 | Isume et al. | 219/130.21 |
| 4,634,830 | 1/1987 | Furudate | 219/110 |

*Primary Examiner*—Clifford C. Shaw
*Attorney, Agent, or Firm*—Heslin & Rothenberg

[57] ABSTRACT

A programmable power control and line voltage monitoring/compensation system for resistance spot welding machines of varying configurations provides maximum time for computer calculation of SCR triggering times and compensates in real time for these input power line fluctuations that affect the welding operation. The power control employs a single programmable delay element, the delay time of which is set while the delay is timing out to generate SCR trigger pulses. The commutation effect in three phase welding machine configurations is taken into account by the power control in determining trigger times. The line monitor synthesizes replica signals of both the primary voltage and current transmitted by the SCRs and processes these replica signals to provide various circuit parameters which can be used as feedback to compensate for only those line variations which affect the welding process.

33 Claims, 12 Drawing Sheets

POWER CONTROL AND LINE VOLTAGE MONITOR/COMPENSATOR FOR RESISTANCE SPOT WELDING MACHINES

BACKGROUND OF THE INVENTION

1. Technical Field

This invention relates generally to signal processing and more particularly to an improved system for providing precision control of single phase or three phase AC line power supplied through thyristor type switching devices to a load such as a resistance spot welding machine.

2. Background Art

Resistance spot welding is a process used to join metals, such as steel, aluminum, titanium and metal-matrix composites, in which coalescence is produced by the heat generated when electric current passes through resistive work pieces held together by electrodes. This process is widely used in aerospace, automotive, appliance and electronic component manufacturing.

Although the resistance welding process has been in existence since Elihu Thompson invented it in 1877, the assurance of weld quality remains a serious concern. Critical to the production of good welds is the ability of the welding machine to reliably deliver actual percent heats in accordance with a desired weld schedule. The term "percent heat" refers to a percentage of the maximum heat that a particular type of welding machine and workpiece configuration may produce. In order to avoid expulsion, i.e. the spewing out of molten material during the welding process, the rate of heat application to a particular type of work piece must be controlled. The heat setting(s) for various cycles of the welding operation is referred to as the weld schedule. A suitable weld schedule for a particular application is typically determined through trial and error and may comprise either a single heat setting or heat settings that vary cycle by cycle or power pulse by power pulse. Once the weld schedule has been determined, it is important that the actual percent heat produced during the welding process closely conform thereto in order to assure consistent, high quality welds.

In resistance spot welding machines, silicon controlled rectifiers (SCRs) or other thyristor type switching devices connected to the primary of a welding transformer control the line power transmitted to the weld electrodes at the secondary of the welding transformer. A pair of back-to-back thyristor type devices are provided at the primary for each input phase signal and are selectively switched on by triggering pulses to transmit power pulses to the weld electrodes. The triggering times are chosen with the goal of providing the desired percent heat to the work piece.

In prior art digitally based thyristor type power controllers, the trigger time of the next thyristor to conduct must be specified prior to the previous zero crossing of the corresponding power line input. This prior art method of digitally controlling thyristor firing times, in the case of a three phase DC power control, involves the utilization of a separate programmable delay for each phase to control the SCR trigger times on that phase. FIG. 9 demonstrates this architecture. The trigger time on each phase is timed from the previous zero crossing of that phase. The desired programmed delay time must be loaded into the programmable delay element (typically a down counter) by the computer prior to this time.

For three phase full wave operation, SCR trigger times must occur between 60° and 180° past the zero crossing. Accordingly for a 60 Herz line frequency, this means that the computer has to have loaded the desired programmed delay time into the programmable delay elements between 2778 microseconds and 8333 microseconds prior to the actual triggering. A power control system which would allow the desired programmed value to be loaded later than this time, and in fact as late as theoretically possible, would be highly desirable since thousands of additional computer operations could be performed during this additional time.

Three phase power control is more complicated than single phase power control and cannot be effectively implemented by merely providing three redundant single phase controllers. In single phase, the thyristor which turns off when its current becomes zero, always turns off naturally at the zero crossing. However, in three phase, a power pulse can be terminated prematurely due to the firing of a subsequent power pulse whose instantaneous voltage is a higher value than that of the present power pulse. This phenomenon which is referred to herein as "commutation" results in the maximum heat per power pulse deliverable by a three phase welding machine being less than that of a single phase machine having a primary which is electrically comparable to a primary of one phase of the three phase machine input. Prior three phase power controllers which fail to recognize and accommodate this phenomenon do not provide linear scaling of "percent heat" with respect to the actual maximum heat deliverable by the machine/workpiece configuration.

Variations in input line power to a welding machine may cause the actual percent heat produced to differ from the desired percent heat. There are several types of prior art primary line monitoring systems. One approach, exemplified by U.S. Pat. No. 4,499,363, monitors the current in the primary. This current monitoring and regulating approach is suitable for arc welding but inapplicable to resistance spot welding since the feedback it provides is not independent of work piece variations at the secondary and in fact provides a contra-indication of steps which need be taken to compensate for input line variations.

A second basic prior art approach is to monitor primary line voltage. Such prior art line voltage monitoring systems generally fall into two categories: (1) those which monitor the average line input value of a single phase, and (2) those which monitor the average value of a three phase full wave rectifier on the line inputs. In both these cases the line input voltage is measured and not the actual voltage input applied by the thyristor type devices to the welding machine. Accordingly, input line power variations which may have no impact on the welding operation because they are not transmitted to the weld electrodes may be unnecessarily detected and compensated for. Further, in case 1, variations on the other phases are not taken into account. In case 2, the signal monitored is representative of the weld machine input when 100 percent heat is applied only. For lower percent heat settings the monitoring system of case 2 does not accurately represent the weld machine input. These prior art systems multiply the measured percent line variation by the expected heat setting to obtain an approximation of the signal error. They are unable to monitor the actual percent heat produced by each individual power pulse. Without such actual pulse-by-pulse measurements it is impossible to accurately compensate in "real time" for those variations in input power which are transmitted to the welding machine.

A need thus exists for a programmable power control and line voltage monitoring and compensation system which affords precise control over actual percent heat delivered by resistance spot welding machines of all configurations, maximizes the time available for determining SCR trigger times, takes into account the commutation effect in three phase welding machine configurations, and in "real time" and at any percent heat setting accurately monitors and compensates for only those input line variations which are transmitted to the weld machine.

SUMMARY OF THE INVENTION

This need is satisfied, and the limitations of the prior art overcome, by the improved power control and line voltage monitoring and compensation system and methods of the present invention. In the power control of this invention, the trigger time of a thyristor type device need only be specified by the trigger time rather than by the prior zero crossing, which has the result of making considerably more time available for the controlling computer to compute the optimum trigger time. This benefit of the invention is realized by employing programmable delay means for generating the trigger pulses in which the programmed delay time is set while the delay is timing out. In a preferred embodiment, the power control is implemented with: a line synchronizer which generates a reference signal that is phase synchronized with the frequency of an input line signal, an up counter the count of which is initiated by the reference signal, a comparator which compares the instantaneous incrementing count of the up counter with count values representing the trigger times and generates trigger pulses when the count of the counter reaches the count values, and a pulse director which directs the trigger pulses to appropriate thyristor type devices to be triggered. The power control is applicable to single phase and a variety of three phase resistance spot welding machines. Trigger times for the thyristor type devices are determined by computer means based upon a desired percent heat. The computer means determines the trigger times as a linear function of the maximum heat actually available from the welding machine configuration taking into account the commutation effect of the thyristor type devices in three phase machines.

The unique line monitoring system of the present invention monitors the voltage of all AC input line signals to the thyristor type devices and synthesizes therefrom a first replica signal replicating the actual composite voltage passed to the welding machine by the thyristor type devices. Step down transformers and a multiplexor for switching between the stepped down signals in synchronism with the switching occurring at the thyristors can be used for this purpose. The replica signal is then processed to produce an independent measurement of a circuit parameter for each individual power pulse. The parameter may, for example, be actual percent heat and/or average voltage. Provision may also be included for the monitoring of primary current and synthesis of a second replica signal replicating the composite current actually passed to the welding machine by the thyristor type devices. This second replica signal can be processed alone to provide a measure of input current, or with the first replica signal to provide a measure of power, conductance, and/or resistance, as well as additional signals predictive of the weld machine secondary conditions, e.g. voltage at the secondary, and for power factor compensation. The measured parameter(s) of the line monitoring system can advantageously be used as feedback to adjust the triggering of the thyristor type devices in such a way as to compensate for those variations in the input line power which affect the welding operation. This line monitoring and compensation system when integrated with the power control of this invention allows compensation for such line fluctuations to be performed as rapidly as is theoretically possible which helps ensure consistent, high quality welds even of very thin materials.

Accordingly, a primary object of this invention is to improve the quality, reliability, repeatability, adaptability and precision of the resistance spot welding process.

Another object is to provide a precision individually controlled power controller that responds to external percent heat commands and transmitted input line power variations as rapidly as is theoretically possible for a thyristor type switching device.

Another object is to provide an input line monitor capable of providing a pulse-by-pulse measure of average voltage, actual percent heat, input current, power, conductance, resistance, and/or voltage at the secondary of a welding transformer.

Yet another object is to provide a line monitoring and compensation system which decouples variations in input line power from variations at the weld transformer secondary and compensates only for those power line variations which are transmitted by the thyristor type devices to the welding machine.

A further object is to provide a precise heat control system for resistance spot welding equipment which automatically compensates for power line variations in real time, right at the primary.

Yet another object is to provide a power control and line voltage monitoring and compensation system which easily retrofits to any existing resistance spot welding machine, readily interfaces to a three phase frequency converter, full wave DC, half wave DC, or single phase welding machine, and which automatically provides correct linear scaling of percent heat taking into account the commutation effect in 3 phase configurations.

A still further object is to provide a power control and line monitoring and compensation system which is more flexible, universal, adaptive, precise, complete and reliable than prior art systems.

Yet another object is to ensure the precise, consistent implementation of various weld schedules by resistance spot welding equipment.

BRIEF DESCRIPTION OF THE DRAWINGS

These and other objects, features and advantages of the invention will be more readily understood from the following detailed description of illustrative embodiments when read in conjunction with the accompanying drawings in which.

DETAILED DESCRIPTION

Figure 1:
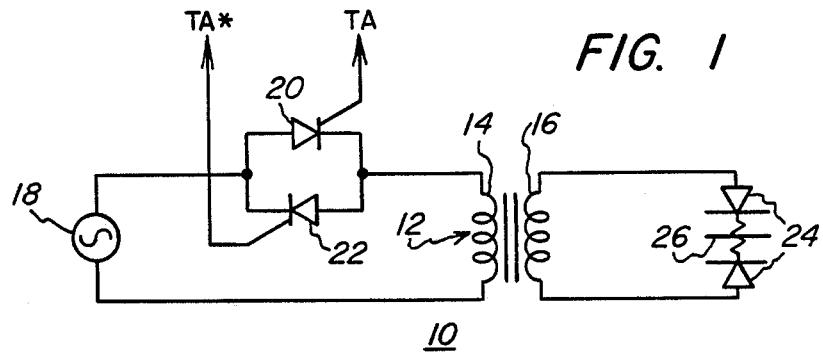
FIG. 1 is a schematic of a single phase welding circuit.

Referring now to the drawings, known welding circuits of various configurations and a typical prior art power control for a resistance spot welding machine will first be presented, and then illustrative embodiments of the improved power control, line monitoring and processing system, and integrated power control and line voltage monitoring/compensation system, of the present invention, will be described.

The present invention addresses the power control needs of resistance spot welding equipment. Such welding machines are designed in various power configurations, i.e. single phase, three phase frequency converter, three phase full wave DC, and three phase half wave DC. One of the advantages of the present invention is that it is applicable, without any hardware modifications, to all of these configurations.

FIG. 1 illustrates, in schematic form, a single phase welding circuit 10. The circuit includes a welding transformer 12 having a primary coil 14 and a secondary coil 16. Primary 14 is connected to an AC single phase power source 18 through a pair of back to back SCRs 20, 22 or other thyristor type devices. (For purposes of this description, SCRs, thyristors and thyristor type devices are considered equivalent switching elements and the terms are used interchangeably). As shown, and more fully described hereinafter, triggering pulses TA and TA* are applied to the gates of SCRs 20, 22 to switch the respective SCRs on at firing times determined by a power control.

Secondary 16 of welding transformer 12 is connected to weld electrodes 24 between which is sandwiched a work piece 26. Typically the work piece comprises two sheets of metal or other material to be joined together. In the resistance spot welding process, electric current passing through the resistive work piece produces heat to coalesce the materials. By controlling the rate of heat generation in the work piece, a molten zone or nugget of desired specifications is formed to spot weld the materials together. If the rate of heat generation is too low, the heat is lost through conduction and the nugget not formed. On the other hand, if the rate of heat generation is too high, the metal sheets may expand so fast that they literally jump apart spewing out the molten material. Further it is desirable to be able to terminate the heat generation before the molten zone exceeds a pressure containment zone created at the outer boundaries of the electrodes. In some critical materials a variation as low as 1% of applied heat can make a difference between a successful and unsuccessful weld.

For a particular application, a weld schedule defining heat settings for each successive cycle of the welding operation is developed, typically by trial and error. Each heat setting corresponds to a percentage of the maximum heat that the particular type of welding machine can produce in a machine cycle and is referred to herein as "percent heat".

Referring again to FIG. 1, the back to back SCRs 20, 22 in effect act as switches for selectively transmitting the input line signal to the welding transformer. In the illustrated back to back arrangement, SCR 20 serves to switch the positive half cycle of the AC input while SCR 22 switches the negative half cycle. Whenever an SCR receives a trigger pulse at its gate, it turns on, transmitting the input signal until the current through the SCR becomes zero. At the zero crossing of the current the SCR automatically turns off. If the SCR is turned on in the middle of an AC input signal cycle, it remains on until the next zero crossing. Therefore, the earlier in time before the zero crossing that the SCR is turned on the bigger the portion of the input power signal that will get through the SCR before it shuts off at the subsequent zero crossing and the greater the power applied at the electrodes. This is illustrated by the wave forms of FIG. 2.

Figure 2:
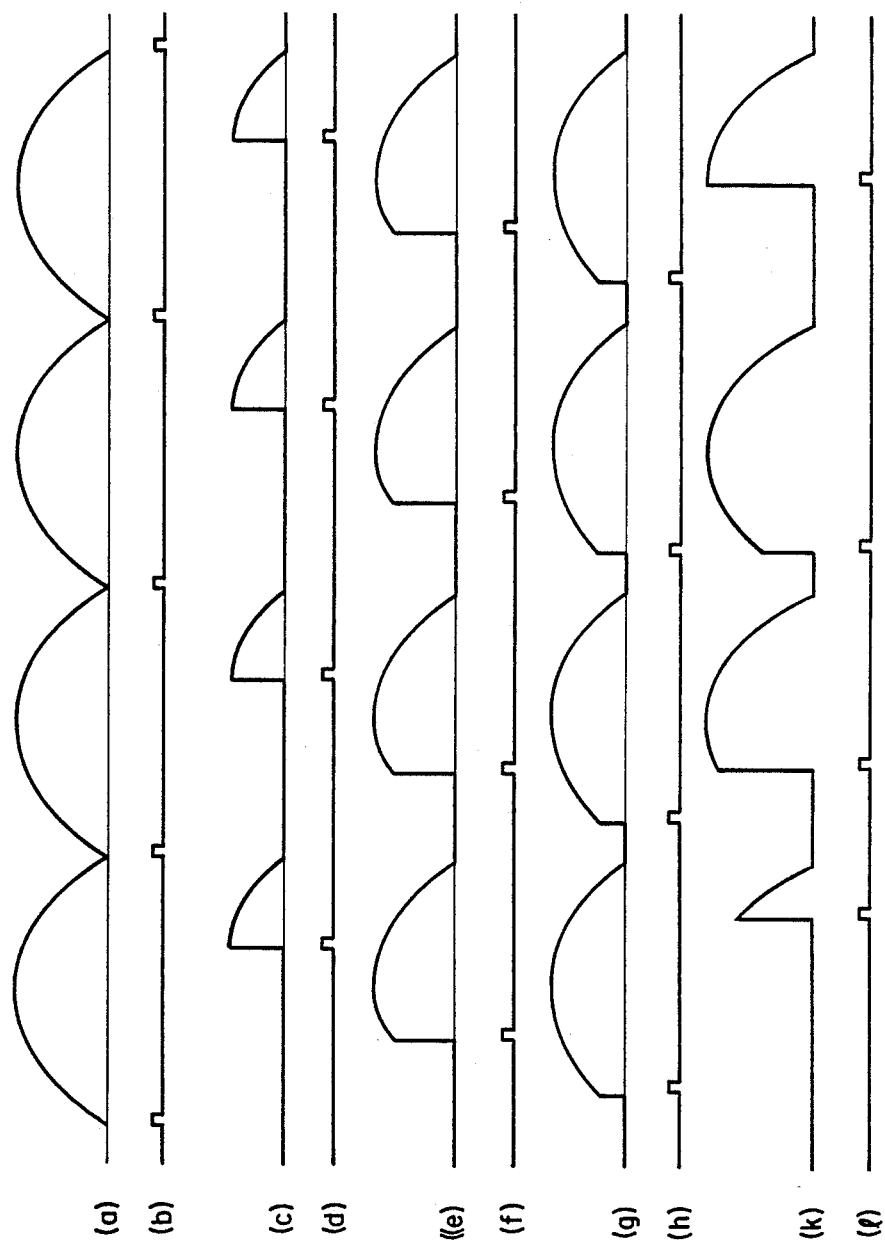
FIG. 2 depicts wave forms useful in understanding the operation of a single phase welding machine.

In FIG. 2 and subsequent similar figures, lines labeled c, e, g and k depict the magnitude of the wave shape of input line signals transmitted by the SCRs in response to respective trigger pulses illustrated in lines d, f, h and l. Line a of FIG. 2 illustrates the transmitted wave shape when SCRs 20 and 22 are successively triggered at the beginning of each half cycle. Lines c, e and g show the transmitted wave shapes for progressively earlier triggering times. In each of the above instances the triggering rate is shown as constant. FIG. 2k illustrates the transmitted wave shape where the triggering time initially decreases and then increases.

Trigger times correlate to percent heat since percent heat is the integral of the SCR transmitted voltage squared over the SCR conduction period. A maximum heat setting of 100% heat accordingly corresponds to the integral of the voltage squared over the entire half cycle in a single phase case. As explained more fully hereinafter, the maximum SCR conduction time for three phase machines is less than that for a single phase because of the commutation effect in three phase configurations. In all configurations, one would ideally like to figure out what the corresponding trigger time should be for any desired percent heat so that it is a linearized function of the maximum heat available from the particular welding machine. A primary function of the power control that provides the trigger signals to the SCRs is to determine what the trigger times should be such that the integral of the voltage squared of the function that actually gets transmitted by the SCR is equal to the desired percent heat.

Figure 3:
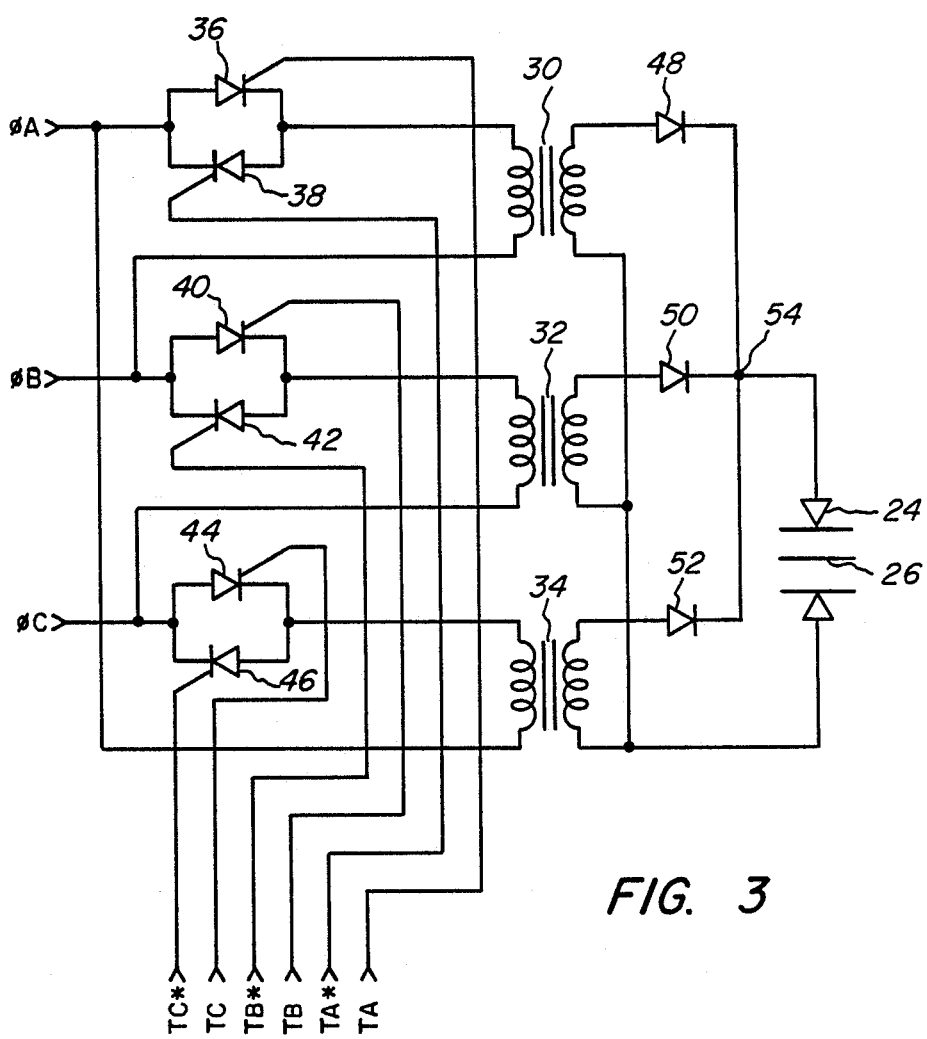
FIG. 3 is a schematic of a three phase half wave welding circuit.

A schematic for a three phase half wave welding machine is shown in FIG. 3. In this configuration, there are three identical transformer sections 30, 32, 34, one for each phase, $\phi A$, $\phi B$, and $\phi C$ and each phase has its own pair of back to back SCRs (36,38) (40,42) and (44,46) respectively. The phases are connected in a delta configuration such that the primary of transformer 30 is connected to phase A through SCRs 36 and 38 and to phase B; the primary of transformer 32 is connected to phase B through SCRs 40 and 42 and to phase C; and the primary of transformer 34 is connected to phase C through SCRs 44 and 46 and to phase A. The secondary of each transformer is connected through respective diodes 48, 50 and 52 to a common junction 54 so that the output voltage between electrodes 24 corresponds to the highest induced voltage of the three phases. The diodes of the other two phases will be reverse biased and hence there will be no signal contribution from them.

Figure 4:
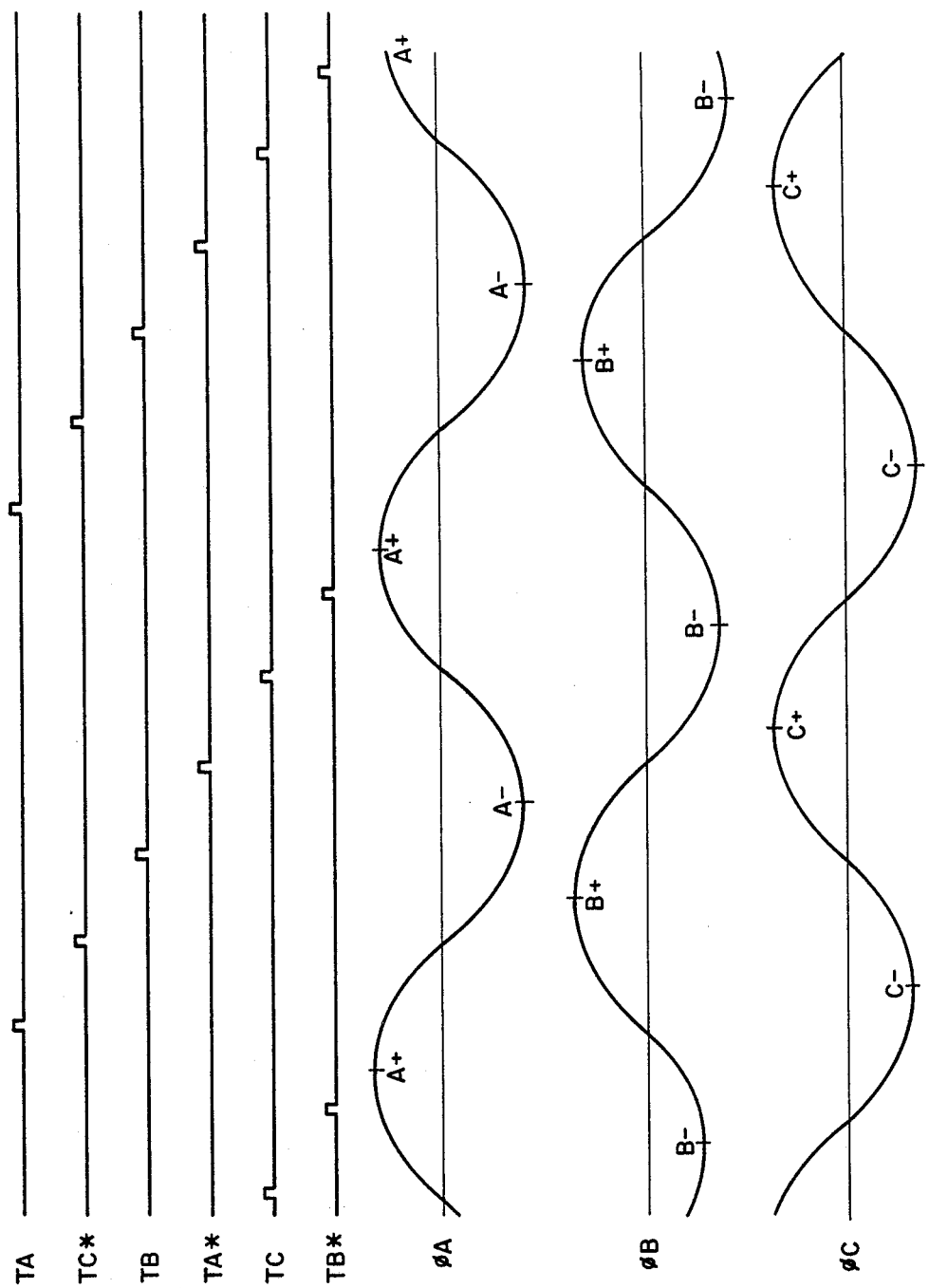
FIG. 4 is a graphical depiction of triggering pulses for a constant percent heat setting and AC input line signals.
Figure 5:
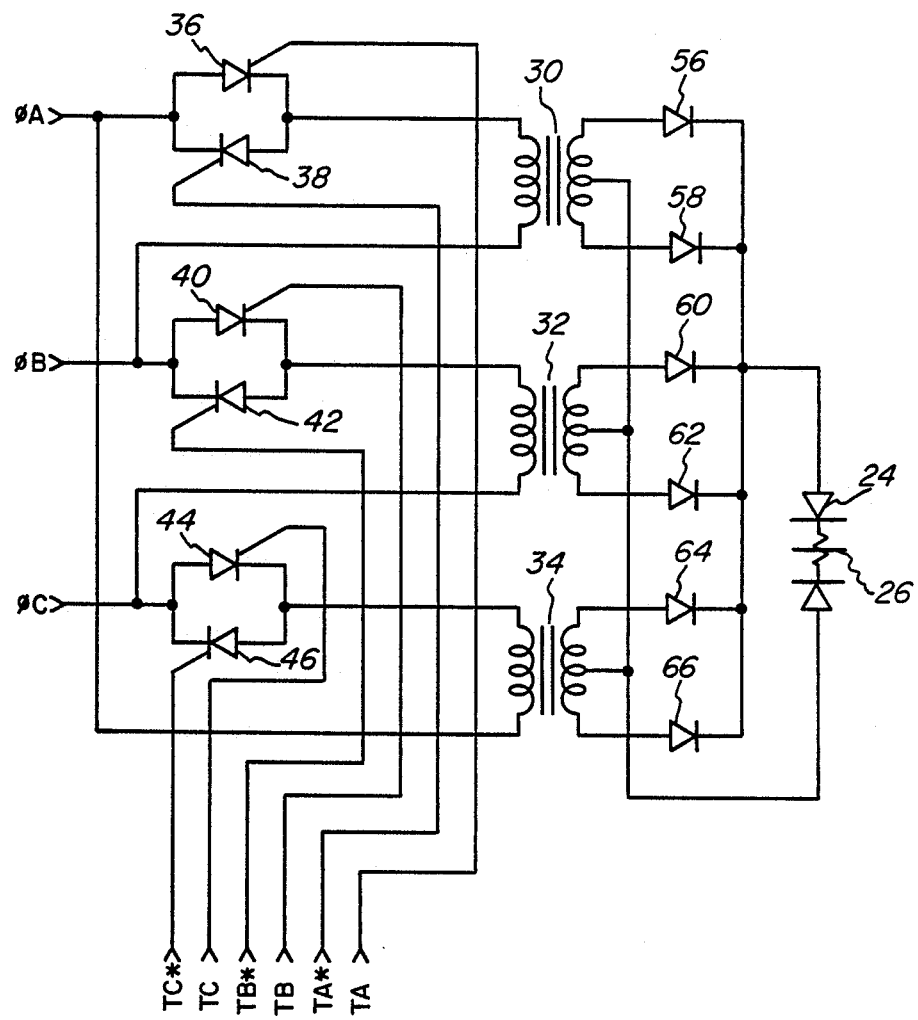
FIG. 5 is a schematic of a three phase full wave welding circuit.

To implement a desired weld schedule with the three phase half wave welding circuit of FIG. 3, triggering pulses TA, TA*, TB, TB*, TC, and TC* are applied at appropriate times by a power control to the gates of respective SCRs 36, 38, 40, 42, 44 and 46. In the bottom half of FIG. 4, wave shapes illustrating the three phase power line inputs are shown. The top portion of FIG. 4 depicts typical trigger pulses which are applied on separate lines to the SCRs of a three phase welding circuit. The actual trigger pulse timing sequence shown in FIG. 4 would be applicable to a three phase full wave welding circuit such as that illustrated in FIG. 5. In this configuration the connections on the primary side of the welding circuit are identical to those of the half wave circuit of FIG. 3. However, on the secondary, there are six diodes 56, 58, 60, 62, 64, and 66 and a center tap on each of the secondary transformers, as shown, such that full wave rectification is achieved. Once again SCR trigger pulses TA, TA*, TB, TB*, TC and TC* are applied by a power control to the corresponding SCRs to regulate power transmitted therethrough with the goal of implementing a desired weld schedule.

Figure 6:
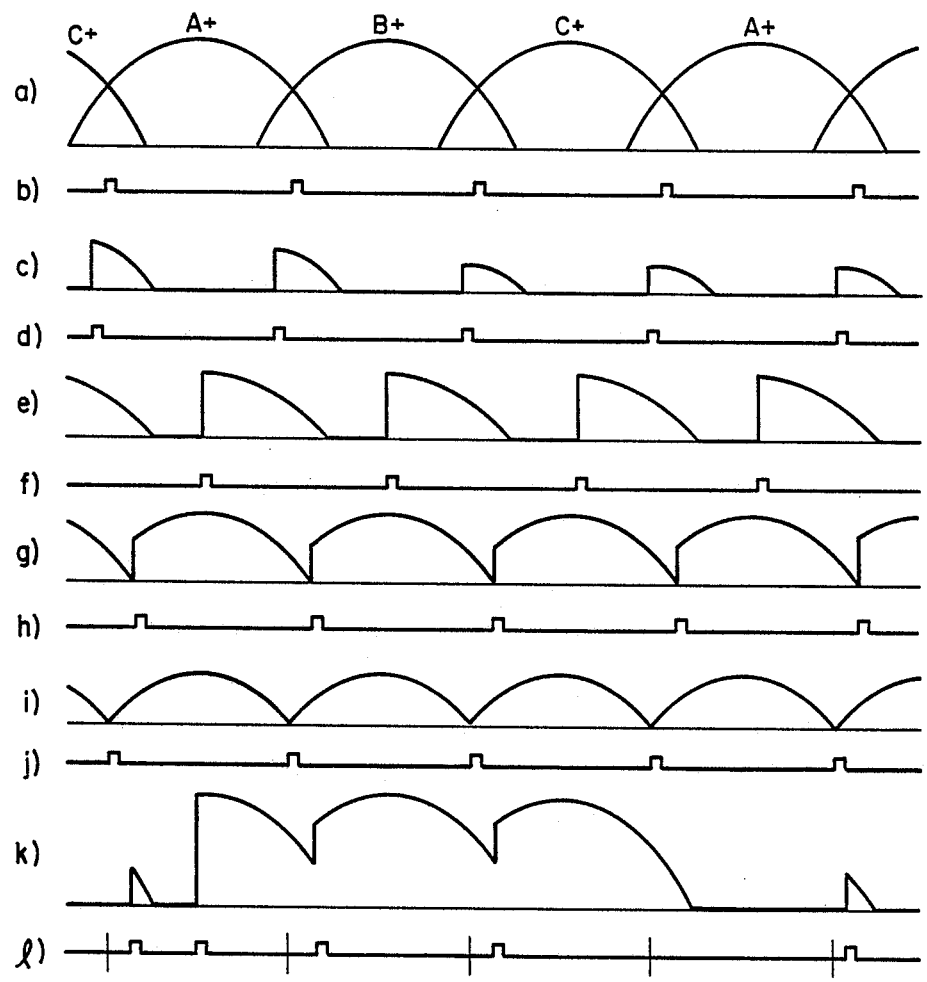
FIG. 6 depicts wave forms relating to a three phase half wave welding machine.
Figure 7:
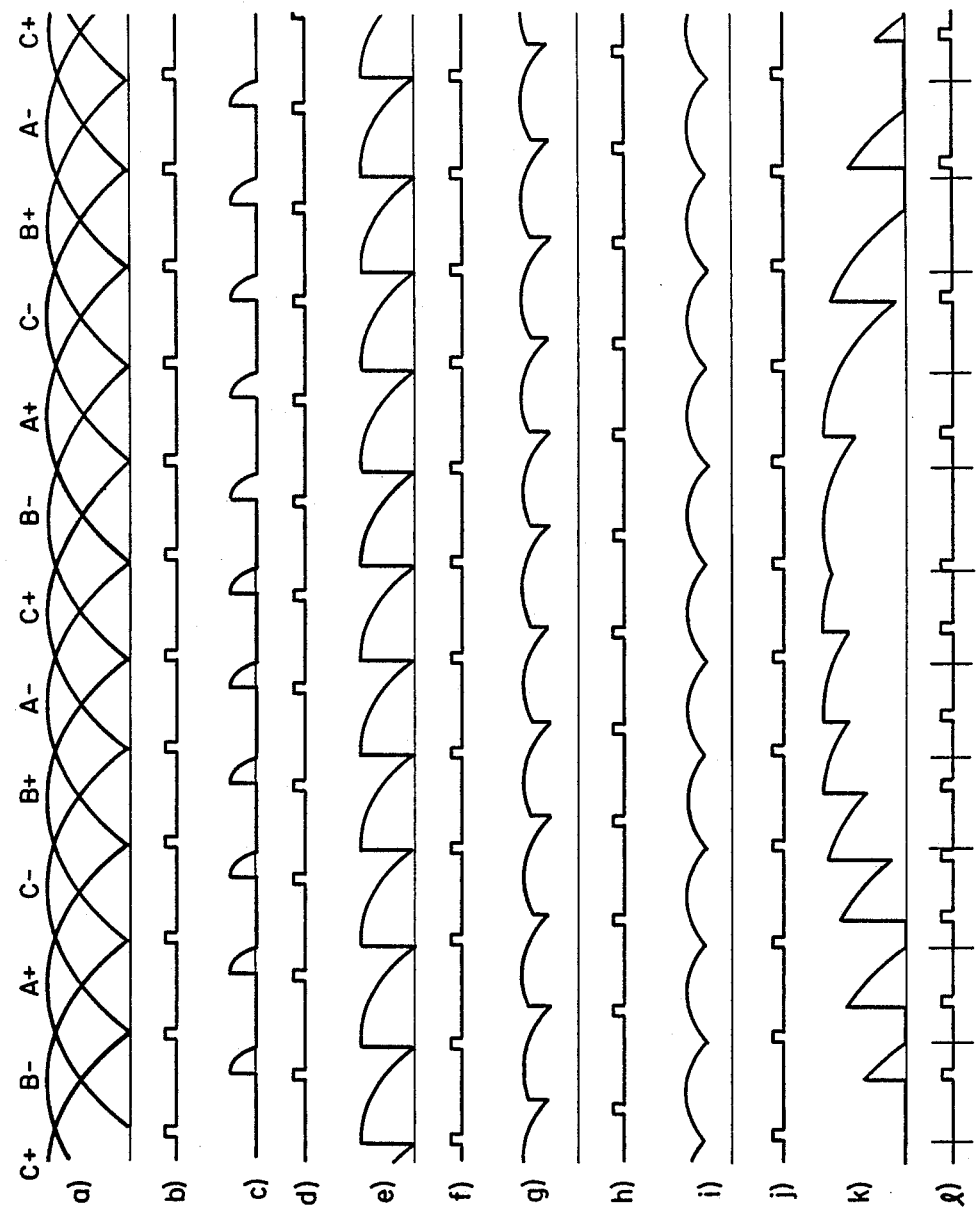
FIG. 7 depicts wave forms relating to a three phase full wave welding machine.

FIGS. 6 and 7 are wave form diagrams illustrating power pulses transmitted by the SCRs and the associated triggering pulses for three phase half wave and three phase full wave configurations, respectively. For ease of illustration, the magnitude of the input signals from which the composite power pulses are composed are shown superimposed in line a, composite trigger pulses are shown in lines d, f, h, j and l and corresponding composite power pulses shown in lines c, e, g, i and k. In FIG. 6, line a, only the positive half cycles of the input phase signals are shown superimposed since the negative half cycles are essentially discarded by the half wave circuit. In FIG. 7, line a, the rectified negative half cycles are shown superimposed along with the positive half cycles of the input phase signals. The sequence of peaks is identified in line a. In both FIGS. 6 and 7, lines c, e, g and i depict steady state power pulses of progressively increasing strength. The wave forms in lines k of these two figures illustrate initially increasing and then decreasing power settings.

Figure 8:
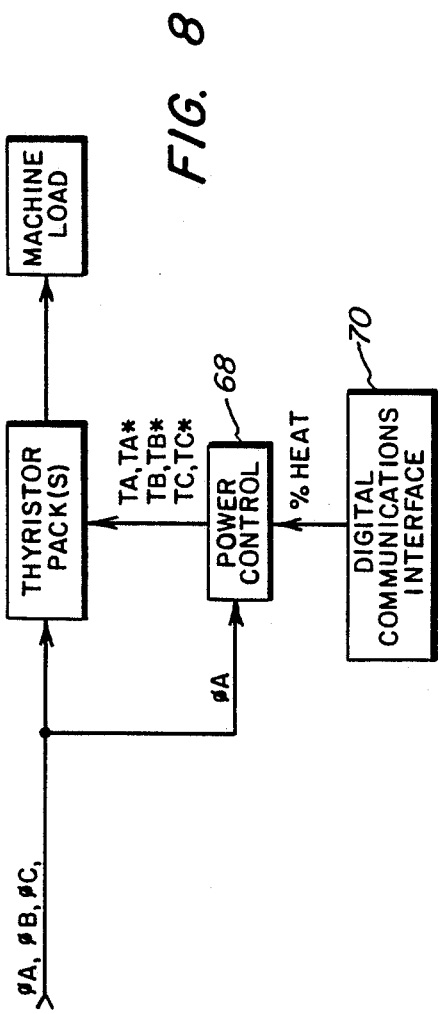
FIG. 8 is a block diagram of a resistance spot welding machine incorporating a programmable power control.

FIG. 8 illustrates, in generalized block diagram form, a spot welding machine having a programmable power control. As previously described with respect to the single phase and three phase machine configurations, input power is applied through thyristor pack(s), consisting of pair(s) of back to back SCRs, to provide regulated power pulses to the machine load. A programmable power control 68 is typically synchronized with an input phase signal and converts externally generated percent heat commands received through a digital communications interface 70 into time coordinated trigger pulses applied to the SCRs.

Figure 9:
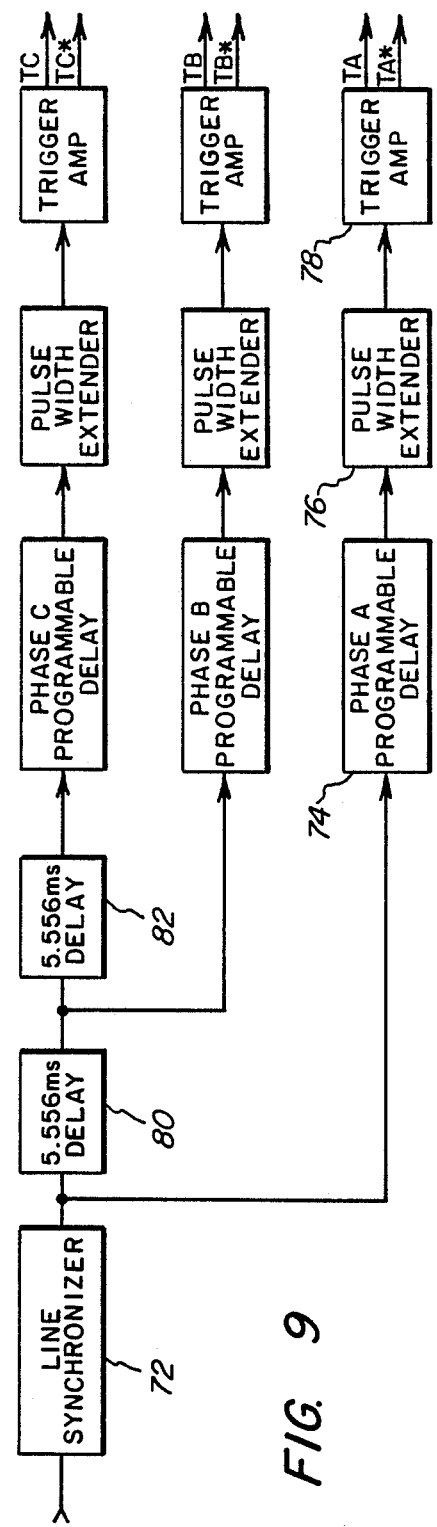
FIG. 9 is a simplified block diagram of a prior art power control.

In prior art digitally based thyristor type power controls, the trigger time of the next SCR to conduct must be specified prior to the previous zero crossing of the corresponding power line input. FIG. 9 illustrates such a programmable power control for a three phase welding machine. This prior art power control utilizes a separate programmable delay for each phase to control the SCR trigger times on that phase. The trigger time in each phase is timed from the previous zero crossing of that phase and the desired programmed delay time must be loaded into the programmable delay element by the computer prior to this time. More specifically, line synchronizer 72 detects each zero crossing of the phase A input signal and thereupon initiates the down counting of a phase A programmable delay element 74. As delay element 74 is typically a down counter, the count which represents the desired trigger time must be specified before the programmable delay element begins counting down to zero, i.e. before the zero crossing of the phase A line input signal. A standard pulse width extender 76 and trigger amplifier 78 convert the output of the programmable delay element 74 into trigger pulses TA and TA*. Duplicate circuit elements are provided to generate trigger pulses TB, TB*, TC and TC*, after suitable time delay by elements 80 and 82 to provide for the known phase shift of the phase B and phase C input signals, respectively. For each half cycle of each input phase, the desired percent heat and corresponding trigger time must be determined and specified to the programmable delay element for that phase prior to the zero crossing at the beginning of the half cycle.

In accordance with the power control of the present invention, the SCR trigger times may be specified right up until the trigger times themselves allowing substantially more time for the computer to determine the optimum trigger times. Thousands of additional computer operations can be performed with this additional time thereby making this feature highly desirable. The power control of this invention also requires only a single programmable delay and pulse width extender thereby significantly reducing the number of circuit elements as compared to the prior art.

Figure 10:
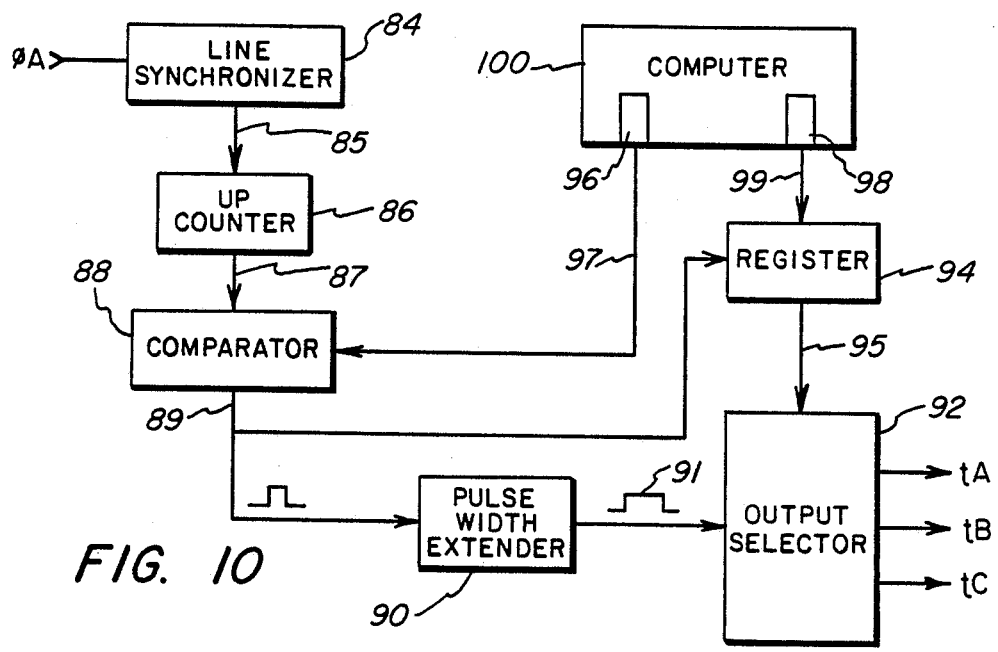
FIG. 10 is a block diagram of a preferred embodiment of the power control of the present invention.

A presently preferred embodiment of the power control of the present invention is illustrated in FIG. 10. This improved power control can be implemented with line synchronizer 84, up counter 86, comparator 88, pulse width extender 90, output selector 92, register 94 and computer 100, connected as shown in FIG. 10.

Line synchronizer 84 synchronizes with the phase A line input frequency (typically 60 hz) and produces reference pulses on output line 85, which occur at the positive going zero crossing of the phase A line input. The line synchronizer is typically implemented with a phase locked loop in order to achieve high immunity to noise on the input. Specific methods of implementation are common art and therefore are not discussed further herein.

Each reference pulse on output line 85 resets up counter 86 to zero. Counter 86 counts up until the next reference pulse is received and then repeats this process. In the invention prototype, the counter counts up incrementally at a rate of 1 Mhz to a count of approximately 16666 after which the next reference pulse resets the counter back to 0. In this implementation, every microsecond of time over an entire cycle is assigned a unique counter value. Of course, other count times and time base values can be used without departing from the spirit of this invention.

Computer 100 controls the time that a trigger pulse occurs by placing a corresponding desired count value in output port 96. Output port lines 97 and counter output lines 87 are both presented to comparator 88 which produces a trigger pulse on its output line 89 when the incrementing count of the up counter reaches the count value in the computer output port 96. Accordingly, the count value representing the desired trigger time need only be specified by computer 100 prior to the time when the up counter reaches that count value. Stated another way, if up counter 86 is considered to be a programmable delay element, its delay time is set equal to said trigger time while the delay is timing out.

The output pulse from comparator 88 is fed to pulse width extender 90 where its width is extended to produce an appropriately wide pulse for SCR triggering purposes. The pulse width extender is standard art and could be implemented with a digital circuit referred to as a one shot. Pulse 91 from pulse width extender 90 is directed to the gates of an appropriate SCR pair via output selector 92 (also referred to as a pulse director).

Meanwhile, up counter 86 continues to incrementally count up and the same count sequence is used to control the timing of all of the trigger pulses over one cycle. In the case of single phase, there will be two trigger pulse times in a cycle, one for phase A positive and one for phase A negative. In the case of three phase half wave, there will be three trigger pulses in a cycle, one for phase A positive, one for phase B positive and one for phase C positive. In the case of three phase full wave there will be six pulses per cycle, one for phase A positive, for phase C negative, for phase B positive, for phase A negative, for phase C positive and for phase B negative in that order. During each cycle, computer 100 successively specifies count values corresponding to the desired trigger times to output port 96. The comparator 88 in turn generates successive trigger pulses when the incrementing count of up counter 86 equals the successive count values in output port 96. These output pulses are extended in width and then directed to the appropriate SCRs by output selector 92.

Computer 100 controls the selection of the output selector via select control lines 95 from register 94. Computer output port lines 99 from output port 98 feed register 94. In operation, when computer 100 loads a count value into output port 96, it also loads an SCR designation into output port 98. Each time comparator 88 outputs a pulse on line 89 it simultaneously updates register 94 with the corresponding SCR designation from port 98. This designation is provided along select control lines 95 to output selector 92 which in turn directs the trigger pulse to the appropriate SCR. Only three output lines labeled tA, tB, and tC are shown from output selector 92. In most instances the circuitry of the thyristor packs are such that both SCRs for any phase can't turn on at once. Therefore, the trigger pulse can be applied to both SCRs and only the one which is properly biased at that moment will turn on.

As will be evident from the above description of a preferred embodiment, the improved power control of this invention only requires that the computer specify the pulse information prior to the desired time of trigger pulse occurrence, thereby resulting in substantially more computer time being available for decision making than with prior art digital power control devices.

Prior art weld heat controls perform three phase heat control essentially with the same control function utilized for single phase welding replicated on the additional phases. They do not recognize the presence of the additional conditions placed on the SCR turn off times because of commutation when performing three phase welding. This oversight results in non-linearity between the control variable and system response at high percent heats.

Three phase power control theory is more complicated than single phase power control theory. In single phase, the thyristor which turns off when its current becomes zero, always turns off naturally at the zero crossing. However, in three phase, a power pulse can be terminated prematurely due to the firing of a subsequent power pulse whose instantaneous voltage is a higher value than that of the present power pulse. At no time are two power pulses conducting current at the same time. This phenomenom referred to as commutation is most easily explained with reference to FIG. 11.

Figure 11:
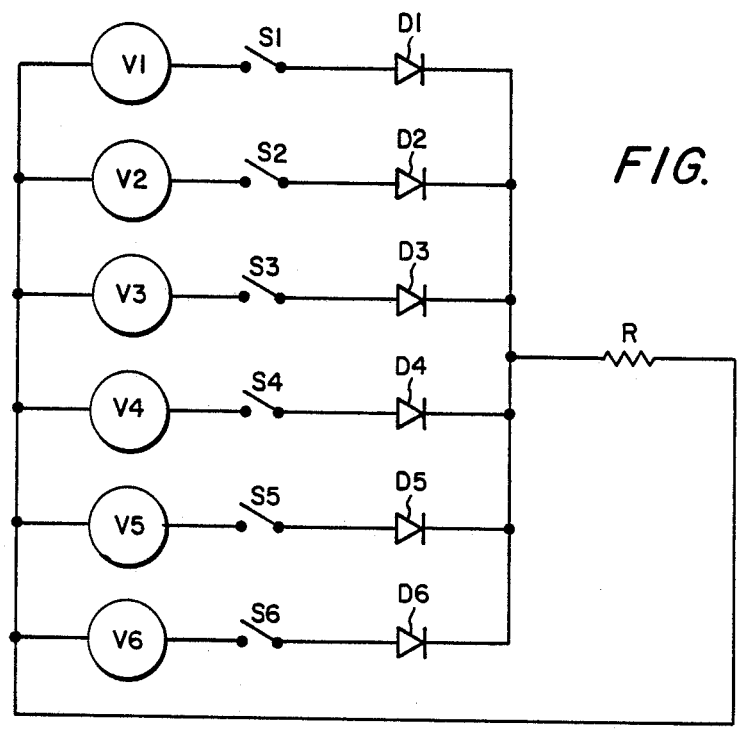
FIG. 11 is a schematic useful in explaining the commutation effect in three phase welding machine configurations.

If all six input voltages (V1-V6) of FIG. 11 are different, current will flow only from the voltage source with the greatest positive magnitude (assuming switches S1-S6 are closed). For example, if V1 is greatest, current will flow out of the V1 source through diode D1, output resistor R and back to the negative input of V1. The other five diodes would be reverse biased because the voltage applied to their cathodes through diode D1 is greater than any of their anode voltages specified from their respective voltage sources.

No current will flow from the other sources because their respective diodes are reverse biased. If voltage V2 was to increase above the value of V1 then diode D2 would become forward biased thereby raising the voltage at the cathodes above V1 volts and causing diode D1 to become reverse biased.

In the case of a three phase welding machine with full wave rectification on the transformer secondary, only one of the output diodes is conducting current (corresponding to the greatest induced voltage at the input) and the other diodes are reverse biased. The operation of the welding machine is therefore analogous to that of the circuit shown in FIG. 11. For the case of the actual welding transformer, the reverse biasing of a diode on the secondary reflects to its primary and causes the halting of current flow through the thyristor from the input feeding it. Once current through a thyristor stops, it turns off. The thyristor cannot be turned on again until it is triggered again at a time when it is in the forward biased condition.

The power control of the present invention unlike those of the prior art, takes into account this commutation effect in determining trigger times which correspond to percent heat commands in three phase machine configurations. The resulting trigger times therefore accurately represent linearly scaled percentages of the maximum heat available from the particular machine configuration.

In determining trigger times, the computer of the power control of this invention can make use of the following equation defining the relationship between the SCR trigger pulse time selection and the average voltage applied to the weld machine primary resulting from SCR conduction:

$$V_{avg} = \frac{1}{T} \int_{\theta_1}^{\theta_2} \sin\theta d\theta = \frac{1}{T}(\cos\theta_1 - \cos\theta_2) \quad (1)$$

Also of interest is equation 2 below which relates the average voltage squared to the SCR trigger pulse time selection. This is commonly referred to in welding as percent heat since for a nonvarying resistive load, the linear variations in the average voltage squared results in linear power (heat) variations in the load. Since heat is what makes welds, it is useful to make the control variable a linear function of heat.

$$\begin{aligned} V^2_{RMS} &= \frac{1}{T}\int_{\theta_1}^{\theta_2} \sin^2\theta d\theta \\ &= \frac{1}{T}\int_{\theta_1}^{\theta_2}(\tfrac{1}{2} - \tfrac{1}{2}\cos 2\theta)d\theta \\ &= \frac{1}{T}[\tfrac{1}{2}(\theta_2-\theta_1) - \tfrac{1}{4}(\sin 2\theta_2 - \sin 2\theta_1)] \end{aligned} \quad (2)$$

Figure 12:
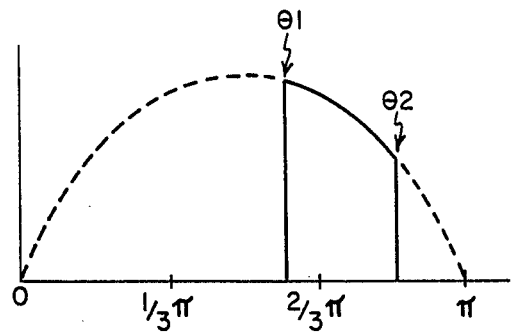
FIG. 12 is a diagram useful in understanding the conduction period of welding machines of various configurations.

As illustrated in FIG. 12, $\theta_1$ corresponds to the computer controlled trigger pulse time (i.e. SCR turn on time), and $\theta_2$ corresponds to the time when the SCR turns off. SCR turn off time either occurs naturally at the zero crossing which makes $\theta_2$ equal to $\pi$ or else it is forced off due to the next SCR being turned on prior to that time in accordance with the commutation effect. Table 1 below shows the constraints placed on $\theta_1$ and $\theta_2$ for single phase AC, three phase DC half wave and three phase DC full wave configurations. Note that T represents the period of the wave.

TABLE 1

|  | T | $\theta_2$ | $\theta_1$ |
|---|---|---|---|
| Single Phase: | $T = \pi$, | $\theta_2 = \pi$, | $0 < \theta_1 < \pi$ |
| 3 Phase Half Wave: | $T = \tfrac{2}{3}\pi$, | $\theta_1 < \theta_2 < \pi$, | $\tfrac{1}{6}\pi < \theta_1 < \pi$ |
| 3 Phase Full Wave: | $T = \tfrac{1}{3}\pi$, | $\theta_1 < \theta_2 < \pi$, | $\tfrac{1}{3}\pi < \theta_1 < \pi$ |

In the single phase case, $\theta_2$ is always $\pi$ and $\theta_1$ can be varied by the computer from $\pi$ to 0 to vary the heat from minimum to maximum. When applying a constant heat setting for three phase half wave, the following conditions apply:

If $\theta_1$ is $> \frac{\pi}{3}$ then $\theta_2 = \pi$;

If $\theta_1$ is $< \frac{\pi}{3}$ then $\theta_2 = \theta_1 + \frac{2\pi}{3}$

When applying constant heat setting for three phase full wave, the following conditions apply:

If $\theta_1$ is $> \frac{2\pi}{3}$ then $\theta_2 = \pi$;

If $\theta_1$ is $< \frac{2\pi}{3}$ then $\theta_2 = \theta_1 + \frac{\pi}{3}$

This commutation effect is graphically illustrated in lines g and i of FIGS. 6 and 7. Line i of each of these figures illustrates the 100% heat setting for the particular three phase configuration. During dynamic heat adjustments, the SCR trigger pulses are closer together in time for increasing heat values, and more spread out for decreasing heat values as shown in line 1 of FIGS. 6 and 7.

Prior art heat controls use the same upper limit of integration $\theta_2$ for three phase half and three phase full wave as for single phase. They don't recognize the fact that the upper limit of integration can be less than $\pi$ and therefore the trigger times they produce are not an accurate representation of percent heat for those cases. In the present invention, the relationships defined by equations 1 and 2 above and the commutation effect discussed above can be implemented by look up tables in the computer of the power control so that when a desired percent heat command is received, the computer can readily determine the $\theta_1$ trigger time corresponding to the particular machine configuration, taking into account the commutation effect in three phase machines.

The basic purpose of the power control described so far is to convert percent heat commands into SCR trigger times correctly. However, because of line voltage variations, it is possible that the percent heat asked for was actually transduced as a different value. The present invention further contemplates a line voltage monitoring/compensation system to determine the percent heat that is actually transduced on a pulse by pulse basis in real time for input line variations that are actually transmitted by the SCRs.

A key object of the monitoring system of this invention is to directly monitor a signal which is representative of the weld machine input for any percent heat setting. This is achieved by simulating the SCR switching process occurring at the weld machine input in order to synthesize a first replica signal from the line voltage representative of the actual voltage applied by the SCRs to the weld machine transformer primary. This first replica signal can then further be processed on a pulse-by-pulse basis in several fashions. Some of these methods include: (1) measuring the average voltage of each SCR power pulse which is useful if the power control is configured for controlling the average weld machine input voltage; (2) measuring the average voltage squared of each SCR power pulse which is useful if the power control is configured for controlling the percent heat input to the welding machine; (3) further processing the replica signal to simulate weld machine characteristics and then measuring the average value over the duration of the SCR power pulse which is useful to simulate the response at the secondary of the welding machine without actually monitoring the machine secondary; and (4) measuring the average value over pulse duration of the product of the first replica signal and a second replica signal representing SCR current to compute the actual power contribution of each SCR power pulse applied to the welding machine.

The first step of the monitoring strategy of the present invention is essentially the synthesis of a voltage signal which looks identical to those composite wave shapes, illustrated in FIGS. 2, 6 and 7, which represent the voltage being passed by the SCRs. Since the monitoring circuitry is relatively low level voltage circuitry and since there are huge rapidly occurring discontinuities in the actual signal outputted from the SCRs, it is impractical to monitor the actual SCR output signal. Accordingly, the approach of this invention is to monitor the sinusoidal line inputs before they have been switched by the SCRs and the line monitoring circuitry essentially replicates the switching occurring at the SCRs and thereby synthesizes a first replica signal that has the identical wave shape to the voltage function actually being passed by the SCRs. Then various methods of processing can be applied to the first replica signal, as described briefly above and more fully hereinafter to provide measurement(s) of circuit parameter(s) on a real time basis which can be used as feedback to compensate for the input line variations which actually affect the welding operation. The line monitoring and signal conditioning system of FIG. 13 performs the desired line voltage monitoring functions. It also includes a subsystem for monitoring the currents transmitted by the SCRs.

Figure 13:
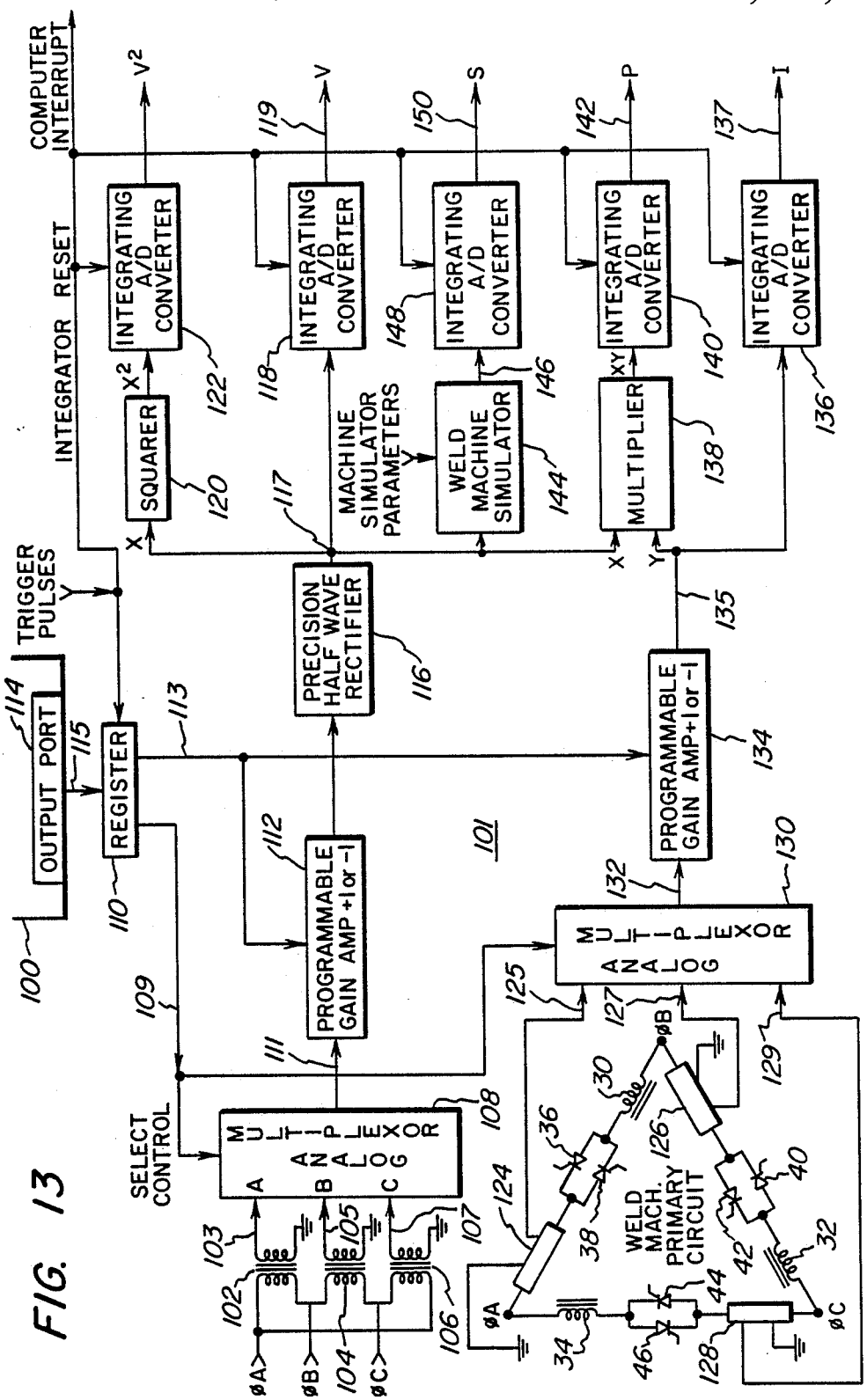
FIG. 13 is a block diagram of one embodiment of a line monitoring and processing system of the present invention.

As shown in FIG. 13, the three phase line voltage inputs φA, φB, φC presented to the weld machine are also monitored by line voltage step down transformers 102, 104 and 106 respectively. These transformers reduce the phase A, phase B, and phase C voltages to low enough levels on lines 103, 105 and 107 respectively for further signal processing to be conveniently performed. Since the input signals are straight sinusoids, the step down transformers are able to accurately reproduce these signals while stepping them down.

The three stepped down signals are presented to analog multiplexer 108 which in effect replicates the switching process occurring at the SCRs by selectively transmitting portions of the stepped down input signals in a fashion identical to SCR switching. Select control lines 109 from register 110 control which one of the three multiplexer input signals is switched to multiplexer output line 111. Register 110 designates the values of select control lines 109 and also the value of line 113 which determines the gain of programmable gain amplifier 112. Register inputs along lines 115 are specified from computer output port 114 of computer 100. The value in register 110 is updated at the leading edge of each SCR trigger pulse.

Amplifier 112 can be controlled to assume a gain of +1 or −1. A precision half wave rectifier 116 removes any negative portion of the signal output from amplifier 112, resulting in a replica signal at 117. This first replica signal is a stepped down composite of the switched input voltages of the six SCRs and accurately represents the actual voltage applied to the weld transformer primary resulting in power dissipation at its secondary.

Computer 100 assists in the implementation of the SCR switching process simulation by, prior to each trigger pulse, loading into its output port 110 the address of the SCR to be fired next. The table below shows the multiplexer address select position and programmable amplifier gain select corresponding to conduction of each SCR.

| SCR No. | Address Select | Gain Select |
| --- | --- | --- |
| 36 | A | + |
| 38 | A | − |
| 40 | B | + |
| 42 | B | − |
| 44 | C | + |
| 46 | C | − |

Computer software controls the sequencing order with the progression of SCR trigger pulses by loading appropriate values into register 110 in the proper order. For signal phase, the sequence order is A+, A−. For three phase half wave DC, the sequence order is A+, B+, C+ for a positive secondary voltage, and A−, B−, C− to produce a negative secondary voltage. For three phase full wave DC, the sequence order is A+, C−, B+, A−, C+, B−.

The first replica signal at 117 can be processed in various fashions. One approach includes the utilization of integrating analog to digital converter 118 to integrate the signal over the SCR conduction interval and produce a digital value on lines 119 for interface to the computer. This value is equal to the average voltage V applied to the welding transformer during the interval that the last SCR was conducting.

Another approach involves squaring the first replica signal with squaring element 120 to produce an analog signal which is then averaged over the SCR conduction interval and converted to digital form by integrating A/D converter 122. This measured digital value is equal to the actual percent heat input $V^2$ presented to the welding machine from the last SCR power pulse with line voltage fluctuations accounted for. The difference between the measured percent heat and the percent heat that was programmed for the last power pulse is the actual percent heat error in the last power pulse. In the invention prototype, feedback that is a function of this error value was employed with the computer to produce power control settings which resulted in optimized power control response to line voltage variations and dynamic percent heat command changes. Such feedback techniques are well understood in this art and are therefore not discussed further herein. The computer can also be used to tabulate the percent heat error of every power pulse throughout an entire weld operation which is important for quality control monitoring purposes. Upper and lower limits can be set on allowable variations and on total accumulated error over the duration of the weld. Again, techniques for implementing these steps within the computer are known to those skilled in this art.

In addition to voltage monitoring of the line input, the current input to the weld transformer primary circuit can also be measured with the aid of Hall Effect current sensors 124, 126 and 128, incorporated with each phase leg of the delta configuration primary circuit of the weld machine, as shown in the bottom left hand portion of FIG. 12. These sensors produce voltages on lines 125, 127 and 129 which are proportional to the current through each respective transformer leg. These signals are input to analog multiplexer 130. The output of analog multiplexer 130 is fed along line 132 to a programmable gain amplifier 134. The selection control lines 109 to analog multiplexer 130 and the gain control lines 113 to amplifier 134 both come from the same source (i.e. register 110) and therefore the operation of these elements is synchronous with their counterparts in the earlier described voltage processing network. The output of amplifier 134 is a voltage referred to herein as the second replica signal which forms a composite representation of the weld machine primary current.

The second replica signal at 135 can be integrated over the SCR conduction interval and converted to a computer readable value by integrating A/D converter 136. Its digital output on line 137 is proportional to the average current I in each SCR power pulse. The sequence of current values throughout a weld is of interest to monitor for quality control purposes. These current values can be used to measure process variations during the weld operation. Monitoring of primary current also offers the ability to employ misfire detection. SCR misfire detection is useful in detecting machine malfunction and performing automatic diagnostics.

Current or power may also be employed as the feedback variable of the power control in some applications. Power produced by each SCR conduction pulse is computed by multiplying the first replica signal and the second replica signal together with multiplier 138 and integrating the result over the SCR conduction interval with integrating A/D converter 140. A digital representation of power P is presented to the computer via lines 142.

The first replica signal (representing primary voltage) can be further processed with a weld machine simulator 144 to produce a simulated voltage on line 146 representative of the secondary voltage of the weld machine. Integrating A/D converter 148 integrates this signal over each SCR conduction interval and presents the result in digital form on output line 150. Simulator 144 can be electronically implemented with a single pole low pass filter to simulate the weld machine characteristics. By making the filter low pass cut off frequency an externally adjustable parameter controlled by the computer, the effect of varying work piece resistance can also be simulated. Computer division of voltage V by current I produces a value which varies with the weld machine impedance. This measured variation with each power pulse can be used to dynamically vary the low pass filter cutoff frequency of simulator 144. The indirect monitoring of work piece resistance in this fashion allows compensation for electrode voltage variations to be performed without the need for direct physical probing on the electrodes.

Figure 14:
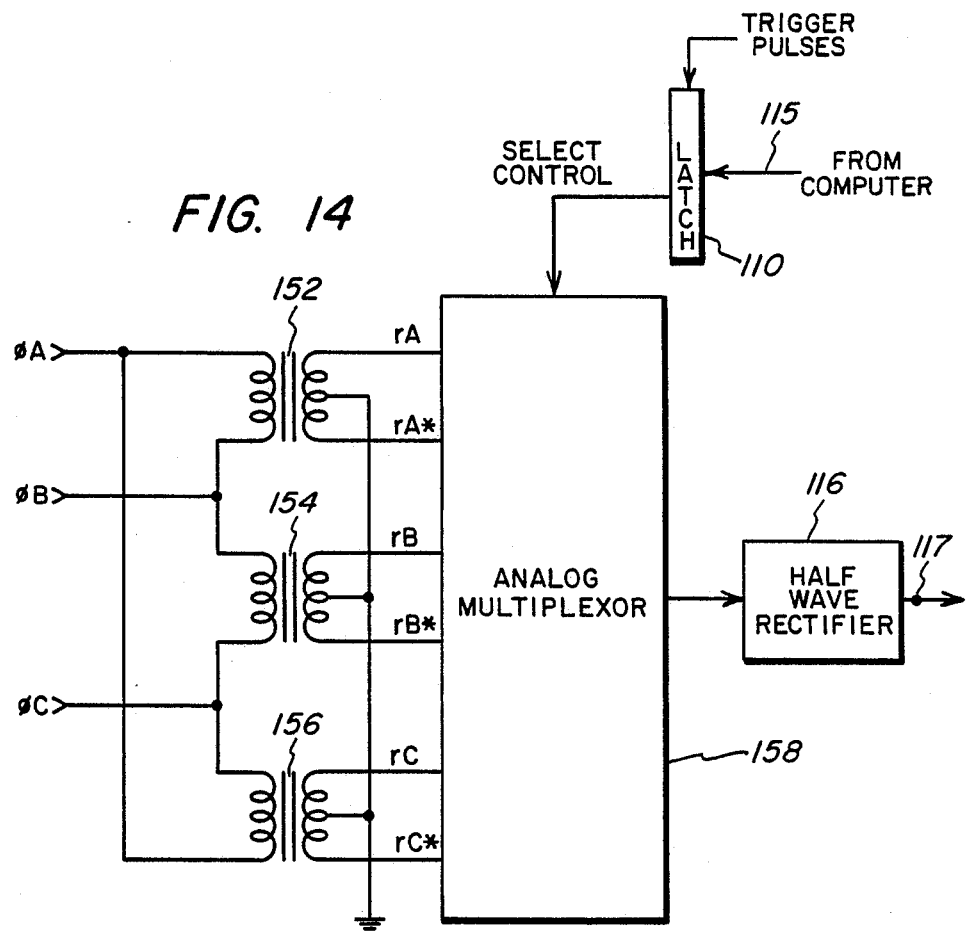
FIG. 14 depicts a variation of the line monitoring and processing system of FIG. 13.

In the line monitoring and signal processing system shown in FIG. 13, each SCR trigger pulse serves to reset all of the integrating A/D converters and to generate a computer interrupt advising the computer that the outputs of the integrating A/D converters should be read. The first and second replica signals can be processed to provide a measure of other circuit parameters and variations in the line monitoring and signal processing circuitry can be made without departing from the scope of the invention. FIG. 14 shows one variation for producing the first replica signal. In this embodiment center tapped step down transformers 152, 154, and 156 produce a positive and negative reference signal for each phase. Analog multiplexer 158 can select among the six input signals so that it can always select a positive version of the signal thereby eliminating the need for the programmable gain amplifier on the output of the multiplexer. In another variation, the precision half wave rectifier 116 can be eliminated by setting the limits of integration for the integrating A/D converters identical to the conduction period for the SCR power pulse.

Figure 15:
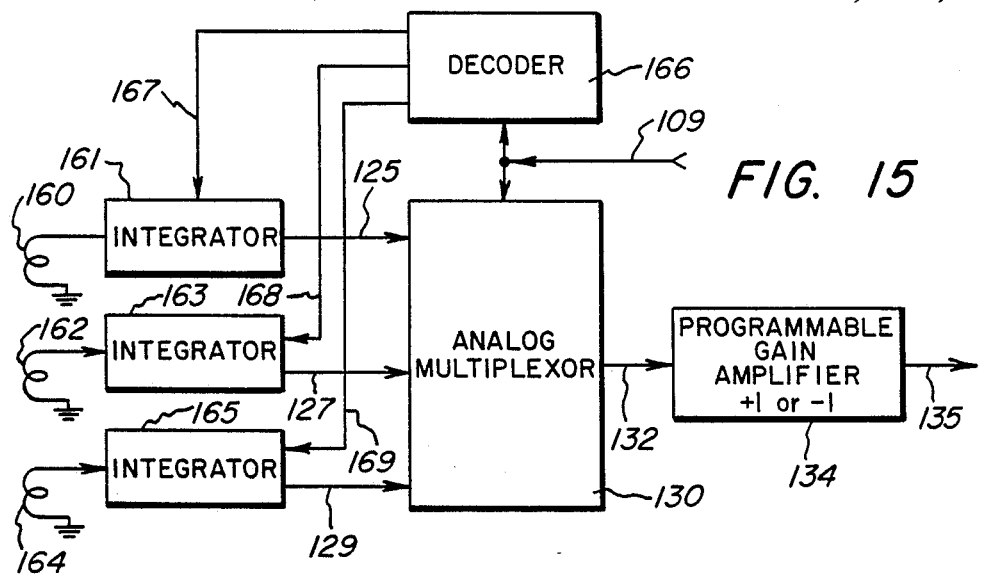
FIG. 15 is a block diagram depicting another variation of the line monitoring and processing system of FIG. 13.

FIG. 15 shows a block diagram of a current monitoring subsystem which can be used when coils are employed as the current monitoring sensors. Since the instantaneous voltage across the coil is proportional to the derivative of the current, integration of the coil output is required in order to obtain a voltage function which is representative of the current. Coil 160 and integrator 161 are utilized to monitor phase A current; coil 162 and integrator 163 are utilized to monitor phase B current; and coil 164 and integrator 165 are utilized to monitor phase C current. Since the current flowing from a particular phase is known to be zero before the SCR corresponding to that phase is turned on, the constant of integration can be properly controlled by forcing the integrator into the reset mode prior to SCR turn on. When an integrator is not in reset mode, it is in the integration mode. Only one integrator is in integration mode at any given time and the other two integrators are in reset mode. This is controlled by the outputs of detector 166.

For example, for frequency converter type switching on the positive wave peaks, the select control lines 109 commutate in the phase sequence A, B, C, A, . . . and the gain of programmable amplifier 134 is set to $+1$. For frequency converter type switching on the negative wave peaks, amplifier 134 is set to a gain of $-1$. When the select control is set for phase A, analog multiplexer 130 is monitoring input line 125 and outputs 167, 168 and 169 from decoder 166 are such that integrator 161 is in the integration mode and integrators 163 and 165 are in the reset mode. When the select control switches to the phase B setting, analog multiplexer 130 monitors input line 127 and decoder outputs 167, 168 and 169 are such that integrator 163 is in the integration mode and integrators 161 and 165 are in the reset mode. Likewise, when the select control switches to the phase C setting, analog multiplexer 130 then monitors input line 129 and decoder 166 places integrator 165 in the integration mode and integrators 161 and 163 in the reset mode. As previously described with reference to FIG. 13, analog multiplexer 130 outputs a composite representation of the current input produced from the three input phases. The signal from multiplexer 130 is transmitted along line 132 to programmable gain amplifier 134 whose polarity is set by the computer such that the output of the amplifier will always be positive in sign.

Figure 16:
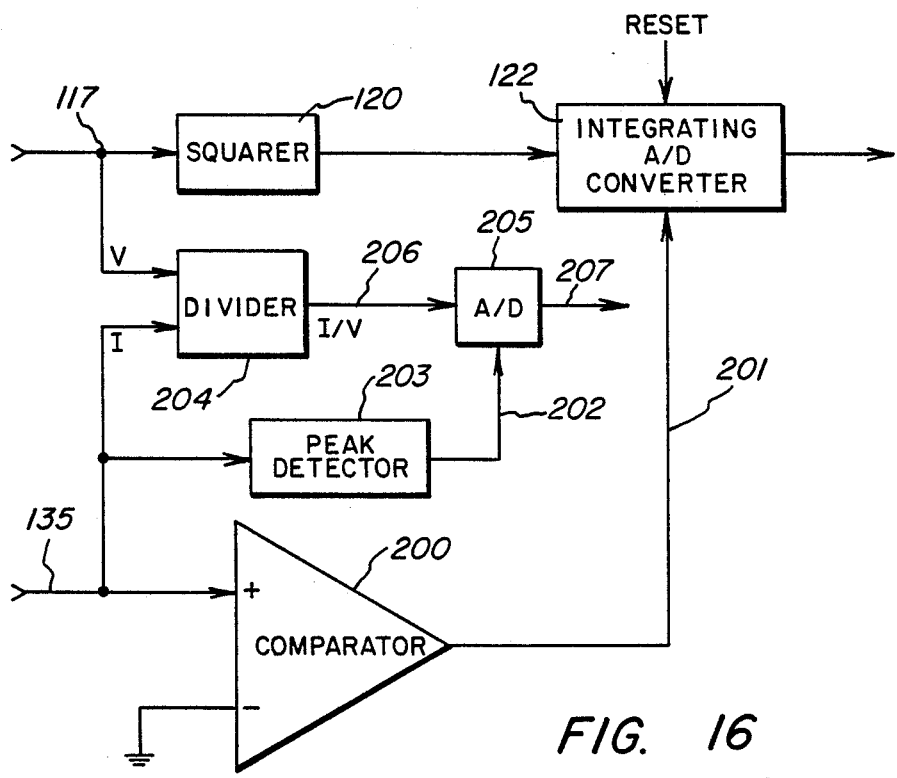
FIG. 16 depicts a further variation of the line monitoring and processing system which facilitates power factor compensation.

FIG. 16 illustrates another variation of the line monitoring and signal processing system of the present invention in which conductance can be monitored and power factor compensation provided. Weld machine input conductance can be computed from the second replica signal on line 135 representing composite current and the first replica signal at 117 representing composite voltage, by dividing the two signals at each current peak. This division is performed with divider 204 to produce an analog output on line 206. Peak detector 203 locates the current peaks on the second replica signal and produces an output strobe on line 202 each time a peak is detected. This strobe initiates A/D element 205 to convert the analog magnitude of the signal on line 206 to a digital output value representative of weld machine input conductance. When employing an analog divider, the denominator is generally constrained to a more limited range of values than the numerator. Since, under factory welding conditions, the line voltage is constrained to a ±20% variation and the current can be programmed to vary over a wide range, conductance is computed rather than resistance since this results in a better signal to noise ratio. If resistance is desired the reciprocal can be computed in a digital domain.

The use of precision half wave rectifier 160 in the embodiment of FIG. 13 to simulate the SCR voltage output function is based on the assumption of unity power factor, i.e. a purely resistive load where the SCR voltage and current are exactly in phase so that when the SCR current goes to zero, the voltage does also. In the case of a low percent heat setting with less than unity power factor, the system shown in FIG. 16 more appropriately models the SCR voltage output function. Since the SCR turns off when its current goes to zero and for low power factors the corresponding voltage could be negative, the precision half wave rectifier is no longer employed. By using a comparator 200 the output of which is applied on line 201 to inhibit the integration process of integrating A/D converter 122 when a current on signal line 135 goes to zero, power factor compensation can be achieved. The result is accurate simulation of the SCR switching function even in the presence of widely varying power factors. This embodiment does, however, require that current monitoring be performed as well as voltage monitoring.

Figure 17:
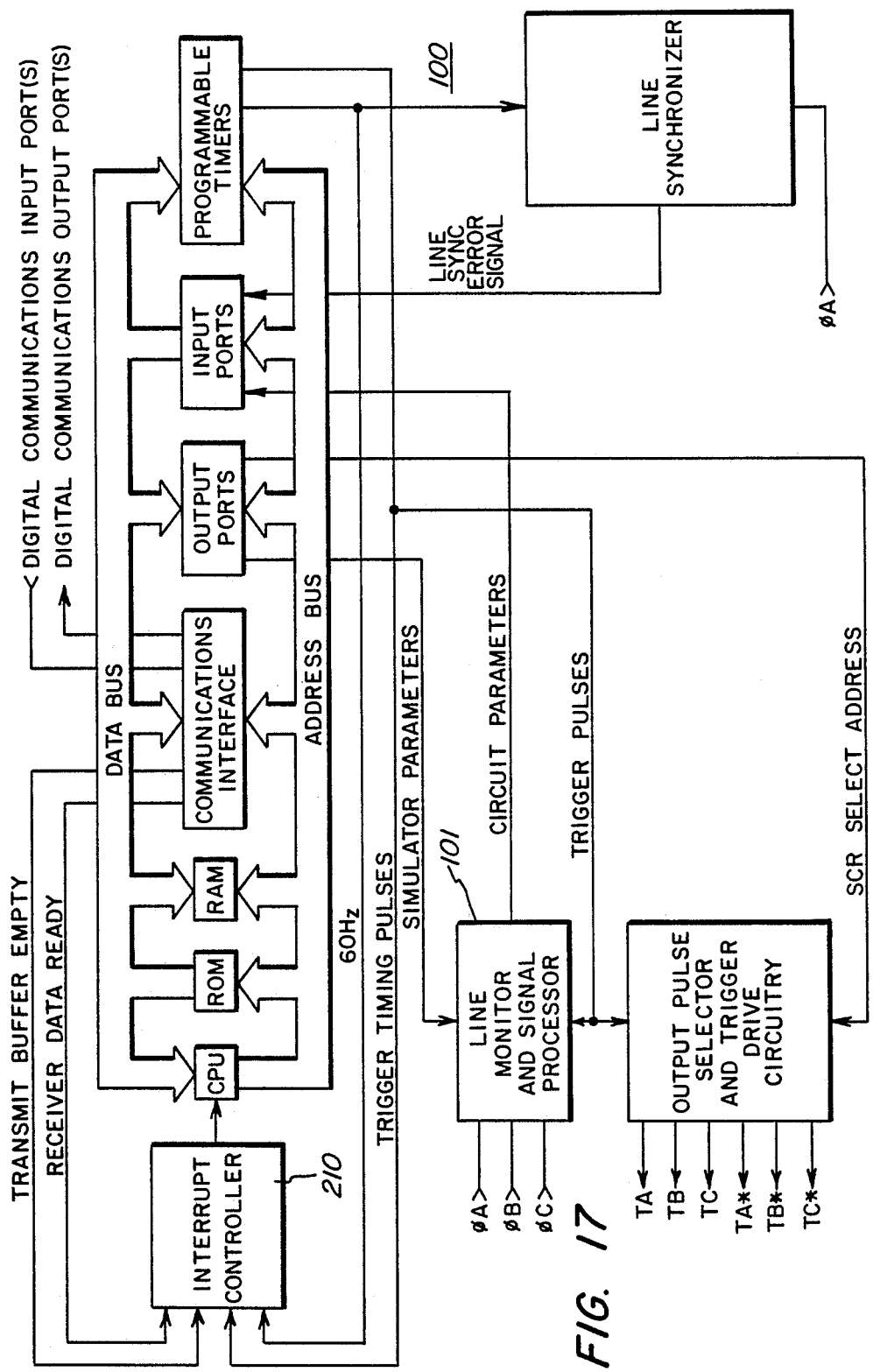
FIG. 17 is a block diagram showing the integrated programmable power control and line voltage monitoring and compensation system of the present invention.

FIG. 17 illustrates in block diagram form a presently preferred actual physical implementation of an integrated programmable power control and line voltage monitoring/compensation system in accordance with the present invention. The line monitor and signal processor 101 processes the input phase signals, and simulator parameters and trigger pulses from computer 100 to generate pulse by pulse measurement(s) of the circuit parameter(s) and supplies same to computer 100 as previously described. The output pulse selector and trigger drive circuitry is really the pulse director of the power control which directs where the trigger pulse is going. The rest of the programmable power control is implemented by computer 100. The line synchronizer shown in the lower right portion of FIG. 17 monitors the phase A line signal and assists computer 100 in creating a reference pulse train synchronized with the phase A input by providing a line sync error signal to the computer. Computer 100 preferably comprises a microprocessor having a standard configuration and including a CPU, ROM, RAM, communications interface, output ports, input ports and programmable digital timers. The communication interface facilitates digital communication with the rest of the welding equipment. An interrupt controller 210 is provided to interrupt the computer upon the occurrence of each trigger pulse so that the computer can then read the various monitored circuit parameters and also specify the next heat control value. There is also a 60 Hz interrupt input which is used by the computer to synthesize a reference pulse train which is synchronized with the phase A signal. Finally transmit and receive interrupts are provided so that the computer can respond when a command comes from the outside world.

The line monitoring system and power control of this invention, when incorporated with a common computer to close a feedback loop, allow compensation for line fluctuations to be performed as rapidly as theoretically possible. When welding thin materials, particularly aluminum, welds are of very short duration. It is therefore important to be able to perform compensation as rapidly as possible. Welds which are only one or two cycles in duration require a power control that provides compensation more often than once per cycle. In three phase full wave applications, this invention allows power adjustments to be made up to six times per cycle. For three phase half wave or frequency converter applications, adjustments can be made three times per cycle, and twice per cycle for single phase. (The control strategy for frequency converter configurations is essentially identical to three phase half wave except that the polarity of the line inputs alternate from weld to weld.) For each of these configurations, the invention offers the controlling computer considerably more time for decision making calculations than prior art controls. Further the invention affords linear scaling of percent heat as a percentage of the maximum available heat for any configuration of welding machine, taking into account the commutation effect in three phase configurations. Moreover, the invention is capable of detecting and compensating in real time for those input line variations which actually affect the welding process.

From the preceding description of illustrative embodiments, it will be apparent to those skilled in this art that the invention achieves all of the objects and advantages previously ascribed to it and represents a significant advance in this art. The invention is intended to include all of those modifications, variations, substitutions and the like falling within the scope of the claims appended hereto.

What is claimed is:

1. A method for pulse-by-pulse monitoring of variations in multi-phase AC input line power applied as sequential power pulses to a load through selectively triggered thyristor type devices of a power control, comprising the steps of:
   monitoring a function of each of the multi-phase AC input line signals to the thyristor type devices, the function comprising one of current and voltage;
   synthesizing from the monitored function, during the operation of the thyristor type devices, a first replica signal replicating the composite function passed to the load by the thyristor type devices, the commutation effect of the thyristor type devices being replicated in synthesizing the first replica signal; and
   processing the first replica signal to produce an independent measurement of a circuit parameter for each individual power pulse.

2. The method of claim 1 wherein the synthesizing step comprises:
   subjecting stepped down signals representative of the voltage of the input line signals to electronic replication of switching as it actually occurs at the thyristor type devices.

3. The method of claim 2 wherein the load comprises a resistance spot welding machine and wherein said first replica signal replicates the actual voltage applied to a weld transformer primary of the welding machine.

4. The method of claim 3 wherein the parameter comprises at least one of the following: average voltage and actual percent heat.

5. The method of claim 4 further comprising the step of compensating for variations in the AC input line power by adjusting the triggering of the thyristor type devices in response to measurement of the parameter.

6. The method of claim 3 further comprising the steps of:
   monitoring the current of the AC input line signals and synthesizing from the monitored current, during the operation of the thyristor type devices, a second replica signal replicating the composite current passed to the load by the thyristor type devices.

7. The method of claim 6 further comprising the step of processing the first and second replica signals to produce a measurement of power produced by each power pulse.

8. The method of claim 6 further comprising the step of processing the first and second replica signals to produce an indirect measure of the voltage at the secondary of the welding machine.

9. The method of claim 6 further comprising the step of processing the first and second replica signals to produce a measurement of actual percent heat per power pulse with power factor compensation.

10. Apparatus for pulse-by-pulse monitoring of variations in AC input line power applied as sequential power pulses to a resistance spot welding machine through selectively triggered thyristor type devices of a power control, comprising:
monitoring means for monitoring the voltage on all AC input lines to the thyristor type devices;
synthesizing means for synthesizing from the monitored voltage, during the operation of the thyristor type devices, a first replica signal replicating the composite voltaged passed to the welding machine by the thyristor type devices; and
processing means for processing the first replica signal to produce an independent measurement for each individual power pulse of at least one of the following: average voltage squared and average voltage.

11. The apparatus of claim 10 wherein the monitoring means comprises step down transformer means for providing stepped down signals representative of the voltage on the input lines; and wherein said synthesizing means comprises means for subjecting said stepped down signals to electronic replication of switching as it actually occurs at the thyristor type devices.

12. The apparatus of claim 11 wherein the synthesizing means comprises multiplexor means for switching between said stepped down signals in synchronism with the switching occurring at the thyristor type devices.

13. The apparatus of claim 12 wherein the synthesizing means further comprises a rectifier and wherein the processing means comprises an integrating analog-to-digital converter which is reset each time a thyristor type device is triggered.

14. The apparatus of claim 13 wherein the processing means further comprises weld machine simulator means for receiving and processing said first replica signal to provide an output signal representative of the actual voltage at the secondary of the welding machine.

15. The apparatus of claim 14 wherein said weld machine simulator means comprises a single pole low pass filter.

16. The apparatus of claim 14 further comprising:
second monitoring means for monitoring the current on the AC input lines;
second synthesizing means for synthesizing from the monitored current, during the operation of the thyristor type devices, a second replica signal replicating the composite current passed to the welding machine by the thristor type devices; and
second processing means for processing the second replica signal to produce an independent measurement for each individual power pulse of at least one of the following: current and actual power.

17. The apparatus of claim 16 wherein the second processing means comprises multiplier means for multiplying said first and second replica signals together to produce the measurement of actual power; and wherein the weld machine simulator comprises a single pole low pass filter having a dynamically varying cutoff frequency which is a function of the first replica signal divided by the second replica signal.

18. The apparatus of claim 10 further comprising:
second monitoring means for monitoring the current on the AC input lines;
second synthesizing means for synthesizing from the monitored current, during the operation of the thyristor type devices, a second replica signal replicating the composite current passed to the welding machine by the thyristor type devices; and
second processing means for processing the second replica signal to produce an independent measurement for each individual power pulse of at least one of the following: current and actual power.

19. The apparatus of claim 18 wherein said second monitoring means comprises one of the following for each input line: a Hall effect sensor; and a current coil in series with an integrator.

20. The apparatus of claim 18 further comprising means responsive to zero and lower values of the second replica signal to provide power factor compensation in the processing of said first replica signal.

21. The apparatus of claim 18 further comprising means for dividing the second replica signal and the 1st replica signal, one by the other, at each peak of said second replica signal to provide a measure of one of the following: input conductance and resistance.

22. The apparatus of claim 10 further comprising compensation means for adjusting the triggering of the thyristor type devices in response to said measurement in such a way as to compensate for variations in the input line power.

23. A programmable power control and line voltage compensation system for generating and supplying trigger pulses to thyristor type devices of a resistance spot welding machine to produce a desired percent heat while compensating for transmitted variations in AC input line power to said machine, comprising:
line synchronization means for generating a reference signal that is phase synchronized with the frequency of an AC input line signal to said thyristor type devices;
programmable delay means for receiving said reference signal and a timing signal representative of trigger times for said thyristor type devices and producing trigger pulses therefrom, the delay means having a programmable delay time which is sequentially set equal to said trigger times while the delay is timing out;
pulse directing means for directing said trigger pulses to appropriate thyristor type devices to be triggered;
monitoring means for monitoring the voltage of AC input line signals to the thyristor type devices;
synthesizing means for synthesizing from the monitored voltage a first replica signal synchronized with the operation of the thyristor type devices and replicating the composite voltage transmitted to the welding machine by said devices;
processing means for processing the first replica signal to produce an independent measurement of a feedback parameter for each individual power pulse transmitted by the thyristor type devices; and computer means for receiving a desired percent heat command and responsive to the measurement of said feedback parameter for determining said triggering times, for generating and providing said timing signal to the programmable delay means and for controlling the pulse directing means, and wherein the system is programmable to operate with single phase configured and multi-phase configured welding machines, and wherein said computer means determines the trigger times as a linear function of the maximum heat actually deliverable by the welding machine taking into consideration the commutation effect of the thyristor type devices in multi-phase configurations, whereby the system affords maximum time for determination of said trigger times and adjusts the trigger times to compensate for only those line variations which would affect the welding process.

24. A power control for single phase and multiple phase resistance spot welding machines of various types, the power control serving to trigger on thyristor type devices to selectively apply input line signals through said thyristor type devices to a spot welding machine of a specified type in order to produce a desired percent of the maximum heat available from the specified type of welding machine, comprising:

computer means for receiving desired percent heat commands and converting said commands into corresponding trigger times, said computer means comprising means for calculating said trigger times as a linear function of the maximum heat actually deliverable by a welding machine of a specified type taking into consideration the commutation effect of the thyristor type devices in multiple phase configurations;

synchronization means for generating a reference signal that is phase synchronized with the frequency of an input line signal to the thyristor type devices;

single programmable delay means for receiving and employing said reference signal and signals from said computer means representative of said trigger times to produce trigger pulses for all of the thyristor type devices; and pulse directing means under control of said computer means for directing said trigger pulses to appropriate thyristor type devices to be triggered according to the specified type of welding machine.

25. The power control of claim 24 wherein operation of said programmable delay means is initiated by said reference signal, and the delay means operates in such a manner that each signal from the computer means need not be supplied to said delay means up until the trigger time represented by said signal.

26. The power control of claim 25 wherein each signal from the computer means comprises a count value corresponding to the represented trigger time; and wherein said delay means comprises:

an up counter for receiving said reference signal, said reference signal serving to reset the count of said counter to zero and to initiate upwards incrementing of said count, and comparator means connected to said up counter and computer means for comparing the count of said counter with each count value and generating a trigger pulse when the count of said counter equals the count value from the computer means.

27. The power control of claim 26 wherein said synchronization means and up counter comprise a digital phase locked loop.

28. The power control of claim 26 wherein the same count sequence of the up counter is used to control the generation of all trigger pulses over one cycle.

29. The power control of claim 24 further comprising:

pulse width extender means connected between said programmable delay means and said pulse directing means for extending the width of all of the trigger pulses; and register means for receiving from said computer means and providing to said pulse directing means a designation of an appropriate thyristor type device to be triggered for each trigger pulse.

30. A programmable power control applicable, without hardware modification, to a single phase and to a variety of multiple phase configured resistance spot welding machines wherein trigger pulses at firing times determined in accordance with a specified welding machine configuration are generated and supplied to thyristor type devices to provide a desired percent heat, comprising:

single programmable delay means for generating in succession all trigger pulses for the thyristor type devices for any specified machine configuration; and pulse directing means for receiving all of the trigger pulses from said delay means and for directing successive pulses to the thyristor type devices in a sequence correlated to a specified welding machine configuration.

31. The improved power control of claim 30 further comprising computer means for calculating a respective trigger time for each thyristor type device, said computer means sequentially communicating the respective trigger times to said delay means after the delay has begun timing out and not later than the respective tigger time; and wherein said computer means also controls the pulse directing means.

32. The improved power control of claim 31 wherein said computer means calculates the trigger times as a linear function of the maximum heat actually deliverable by the welding machine taking into consideration the commutation effect of the thyristor type devices in multiple phase configurations.

33. A method of selectively controlling the power provided by substantially sinusoidal input multi-phase signals passed by thyristor type devices to a multi-phase resistance spot welding machine during a single cycle, comprising the steps of:

determining appropriate firing times for respective thyristor type devices taking into account the commutation effect of such devices;

converting said firing times to successive specified corresponding count values;

initiating incremental counting by an upcounter upon the occurrence of a zero crossing of an input phase signal; and comparing the incrementing count of said counter with the successive specified count values and providing a trigger pulse to the respective thyristor type device when the count of the upcounter reaches the corresponding count value.

* * * * *